(12) United States Patent
Alba-Rivera et al.

(10) Patent No.: US 10,772,464 B1
(45) Date of Patent: Sep. 15, 2020

(54) PORTABLE ELECTRIC HEATING DEVICE FOR DISPOSABLE HOT BEVERAGE CONTAINERS

(71) Applicants: Gabriel A Alba-Rivera, Mesa, AZ (US); Victoria R Gregory, Tully, NY (US)

(72) Inventors: Gabriel A Alba-Rivera, Cambridge, MA (US); Victoria R Gregory, Cambridge, MA (US)

(73) Assignee: Magis Industries, Inc., New York, NY (US)

( * ) Notice: Subject to any disclaimer, the term of this patent is extended or adjusted under 35 U.S.C. 154(b) by 268 days.

(21) Appl. No.: 15/893,602

(22) Filed: Feb. 10, 2018

(51) Int. Cl.
*A47J 36/24* (2006.01)
*A47J 41/00* (2006.01)
*F25B 21/04* (2006.01)
*F25D 31/00* (2006.01)

(52) U.S. Cl.
CPC ....... *A47J 36/2472* (2013.01); *A47J 36/2461* (2013.01); *A47J 41/005* (2013.01); *F25B 21/04* (2013.01); *F25D 31/002* (2013.01)

(58) Field of Classification Search
CPC .. A47J 36/2461; A47J 36/2472; A47J 41/005; F25D 31/002
See application file for complete search history.

(56) References Cited

U.S. PATENT DOCUMENTS

| | | | |
|---|---|---|---|
| 6,192,787 B1 * | 2/2001 | Montalto | A47J 36/2472 219/430 |
| 6,310,329 B1 * | 10/2001 | Carter | A47G 19/2288 219/430 |
| 9,265,371 B2 * | 2/2016 | Glucksman | A47J 36/2461 |
| 9,814,331 B2 * | 11/2017 | Alexander | A47G 19/027 |
| 2018/0078087 A1 * | 3/2018 | Benitez | A47J 36/2472 |

FOREIGN PATENT DOCUMENTS

WO WO-03105640 A1 * 12/2003 ............. F25B 21/04

* cited by examiner

*Primary Examiner* — Ryan A Reis

(57) ABSTRACT

A portable electric heating apparatus for warming a liquid and maintaining the elevated temperature of a liquid held inside a hot beverage container. The housing (23) of the apparatus may be inserted within the perimeter of a bottom rim of the beverage container so that a heating plate (22) releasably contacts a bottom wall of the container. A controller (25) enclosed in the housing includes electrical circuitry for communicating with a supply of electric power and for energizing a heating element (31). In various embodiments, electric power may be provided from wall outlets, USB ports, or batteries, which may be disposable or rechargeable. The heating element is configured to transfer heat to the plate, which warms the liquid through the bottom wall of the container.

19 Claims, 6 Drawing Sheets

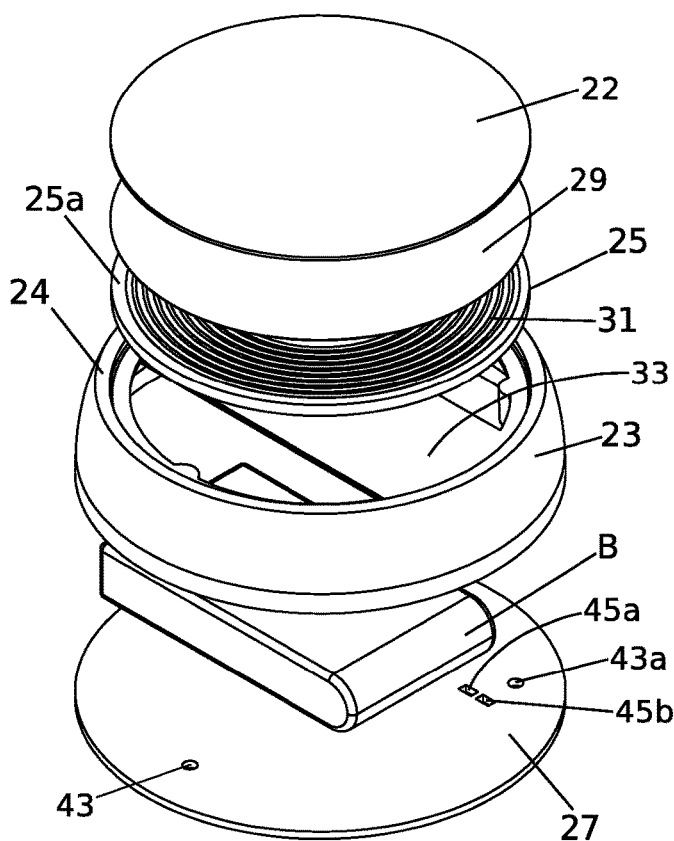
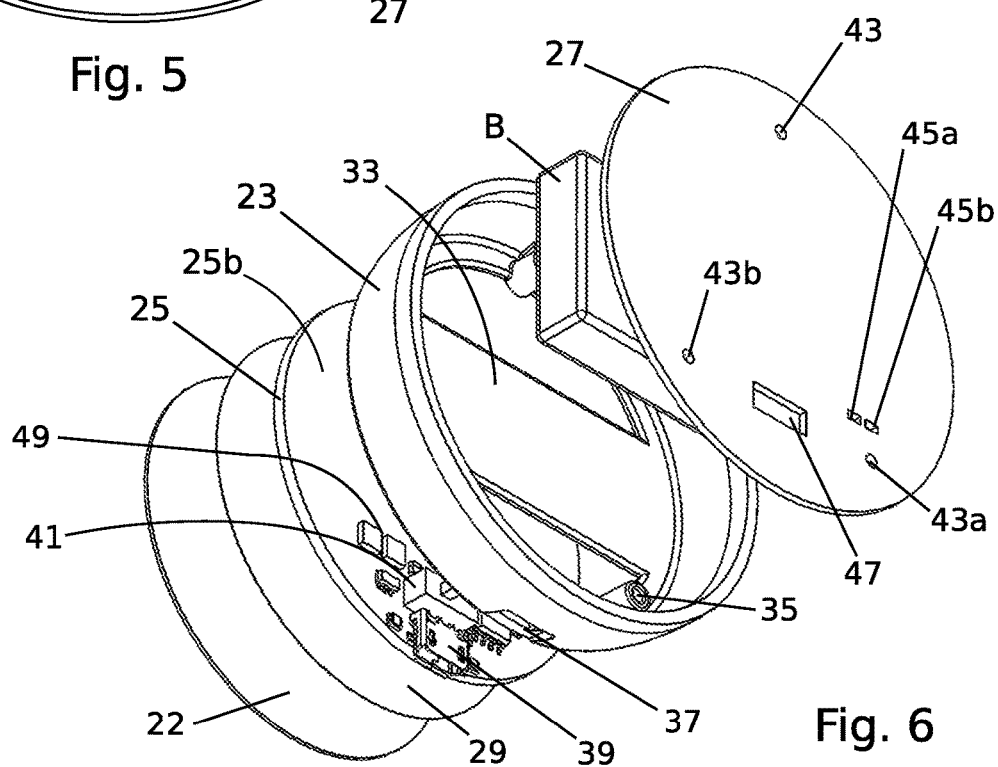

PORTABLE ELECTRIC HEATING DEVICE FOR DISPOSABLE HOT BEVERAGE CONTAINERS

TECHNICAL FIELD

This invention relates generally to a beverage warmer, and more specifically to a wireless and portable beverage warmer for maintaining the elevated temperature of liquid contained in a hot beverage container at an ideal drinking temperature.

BACKGROUND

The following is a tabulation of some prior art that presently appears relevant:

U.S. Patents

| Patent Number | Kind Code | Issue Date | Patentee |
|---|---|---|---|
| 4,980,539 | B1 | 1990 Dec. 25 | Walton |
| 6,121,585 | B1 | 2000 Sep. 19 | Dam |
| 6,192,787 | B1 | 2001 Feb. 27 | Montalto |
| 5,148,688 | B1 | 1992 Sep. 22 | Pimm etal. |
| 6,267,110 | B1 | 2001 Jul. 31 | Tenenboum etal. |
| 5,072,095 | B1 | 1991 Dec. 10 | Hoffman |
| 9,186,006 | B2 | 2015 Nov. 17 | Soule |
| 8,274,016 | B2 | 2012 Sep. 25 | Montana |
| 6,870,135 | B2 | 2005 Mar. 22 | Hamm etal. |
| 9,265,371 | B2 | 2016 Feb. 23 | Glucksman et al. |

U.S. Patent Application Publications

| Publication Nr. | Kind Code | Pub. Date | Applicant |
|---|---|---|---|
| 20160183730 | A1 | 2016 Jun. 30 | Design HMI LLC et al. |
| 20120061050 | A1 | 2012 Mar. 5 | Petrillo et al. |

Many people purchase hot beverages "to-go" at coffee shops, convenience stores, espresso stands, and the like. Although there are several types of hot beverages such as coffee, caf latte, tea, chai, etc., at every coffee shop these beverages are commonly served in a container that the purchaser can dispose of after use. These disposable hot beverage containers are frequently made of waterproof cardboard or a paper-based material carrying a plastic lid on top. Many purchasers prefer to drink their beverages at a leisurely pace while walking or traveling on a train or in an automobile. Since such drinks may consist of 12 oz. or more in quantity, it is often desirable to consume them over a period of 15 minutes or more. The problem is that hot beverages cool rapidly in the paper container, and are less desirable or satisfying than when originally purchased.

Containers made of Styrofoam or a foam-based material are occasionally used to serve hot beverages, and may provide some thermal insulation to retard cooling, but many hot-beverage aficionados believe that Styrofoam imparts an unpleasant side-taste to the beverage. In addition, there is widespread and increasing resistance to the use of Styrofoam on environmental grounds. Establishments catering to the serious hot-beverage consumers invariably use the waterproof paper containers.

There is a large variety of insulated containers available, and many people simply transfer their hot beverages from the ubiquitous paper containers to the insulated ones, and thus consume their beverage at their leisure. Some of these containers also have provisions for electrically heating the contained beverage, and are shown by the following: Walton in U.S. Pat. No. 4,980,539 (1990), Dam in U.S. Pat. No. 6,121,585 (2000), Montalto in U.S. Pat. No. 6,192,787 (2001), and Bedi et al. in U.S. Pub No. 20160183730 (2016). These vessels can be quite effective in maintaining and/or heating a beverage to a desired temperature, but they require users to carry the insulated container to the beverage shop or have it available nearby. They also necessitate the user to wash the container after use. The convenience of the paper container, which can be disposed of after the beverage is consumed, is lost.

Similar heating containers exist, but they burn fuel or generate exothermic reactions to provide heat to the contained beverage. Examples of such vessels are shown by Pimm et al. in U.S. Pat. No. 5,148,688 (1992) and Tenenboum et al. in U.S. Pat. No. 6,267,110 (2001). In addition, One Step Ahead/Leaps And Bounds Co. of Lake Bluff, Ill. distributes a commercially available baby-bottle warmer utilizing an exothermic heating element, calling it "Reusable On-The-Go Bottle Warmer," Item No. 06918. However, all of these aforementioned containers and devices rely on the use of a specialized vessel for containing the hot beverage, and none can be adapted for use with the waterproof paper hot beverage containers presently distributed widely.

Also available are small hotplates designed to keep beverages in a container at or near optimum drinking temperature, as shown in U.S. Pat. No. 5,072,095 to Hoffman (1991). Such hotplates, designed for use on a desk or counter, work well with conventional ceramic or metal beverage containers, but are not very effective when used with the conventional "to-go" paper containers. Since the bottom wall of the beverage-containing part of the container is recessed inside the bottom of its walls, this beverage-containing part does not contact the heated surface of the hotplate. Thus, Hoffman's hotplate is unable to effectively heat beverages contained in conventional waterproof paper containers.

Another approach to prevent hot beverages from cooling involves using phase change material, shown by Petrillo et al. in U.S. Pub. No. 20120061050 (2012). Small capsules of the material are placed directly in a hot beverage to maintain it at a drinkable temperature. However, the user has little control over the preferred temperature, and the user is at risk of swallowing the capsules. Similar to the vessel heaters, cleaning the device after use is also required, since it is surrounded by liquid.

There also exist heating devices that slip over paper hot beverage containers, as shown in U.S. Pat. No. 9,186,006 to Soule (2015), U.S. Pat. No. 8,274,016 to Montana (2012), U.S. Pat. No. 6,870,135 to Hamm et al. (2005), and U.S. Pat. No. 9,265,371 to Glucksman et al. (2016). Although these inventions are able to heat liquid contained in paper beverage vessels, there are some problems with them. For one, the warming sleeve may be uncomfortably hot to touch, and therefore not optimal to hold in one's hand. Second, the apparatus requires an exterior force either by hand or from a horizontal planar surface, such as a table or cup holder, to remain in contact with the hot beverage container. Moreover, the invention described by Soule increases the thickness and length of the beverage-containing vessel. Hamm et al. asserts that it can easily be stowed in a pocket or purse, but it seems too bulky for that. Moreover, those of Soule's and Montana's are not portable and require connecting the apparatus to an external power source, such as a car outlet, while warming the beverage.

A device that serves as a hybrid between a hotplate and a warming sleeve for paper containers would be useful since one such device could offer the wireless convenience and portability of Hamm's yet also deliver heat to the beverage without uncomfortably burning the user's skin.

In conclusion, a diligent search of the patent literature failed to identify any portable device that could be used to warm or maintain the elevated temperature of a beverage ordered "to-go" without eradicating the look and feel of the disposable container.

SUMMARY

In accordance with one embodiment, an electric heating apparatus comprises a housing having an outer surface shape which fits circumferentially within a bottom rim of many conventional disposable paper cups. The apparatus further comprises a heating element operably associated with a heating plate, which has a surface that is raised above the housing. Heat is transferred through the top heating plate to a bottom wall of a hot beverage container and thus to the liquid inside. The housing encloses a controller comprising electrical circuitry, which communicates with an electric power source for energizing the heating element. In one embodiment, a battery is also enclosed in the housing, allowing a user to warm or maintain the elevated temperature of a beverage on-the-go without relying on an external power source during use. It may be rechargeable and when not in use, the apparatus may conveniently fit in a clothes pocket, backpack, or purse.

Accordingly several advantages are to provide an improved electric heating apparatus for the many on-the-go hot beverage drinkers, provide a more user-friendly electric heating apparatus that does not require cleaning after use, and provide a more versatile electric heating apparatus that can be used with waterproof paper containers. Still further advantages will become apparent from a study of the following description and the accompanying drawings.

BRIEF DESCRIPTION OF DRAWINGS

FIG. 5 shows a general perspective, exploded view of the apparatus shown in FIG. 1.

FIG. 6 shows a general perspective, bottom, exploded view of the apparatus shown in FIG. 1.

Figure 1:
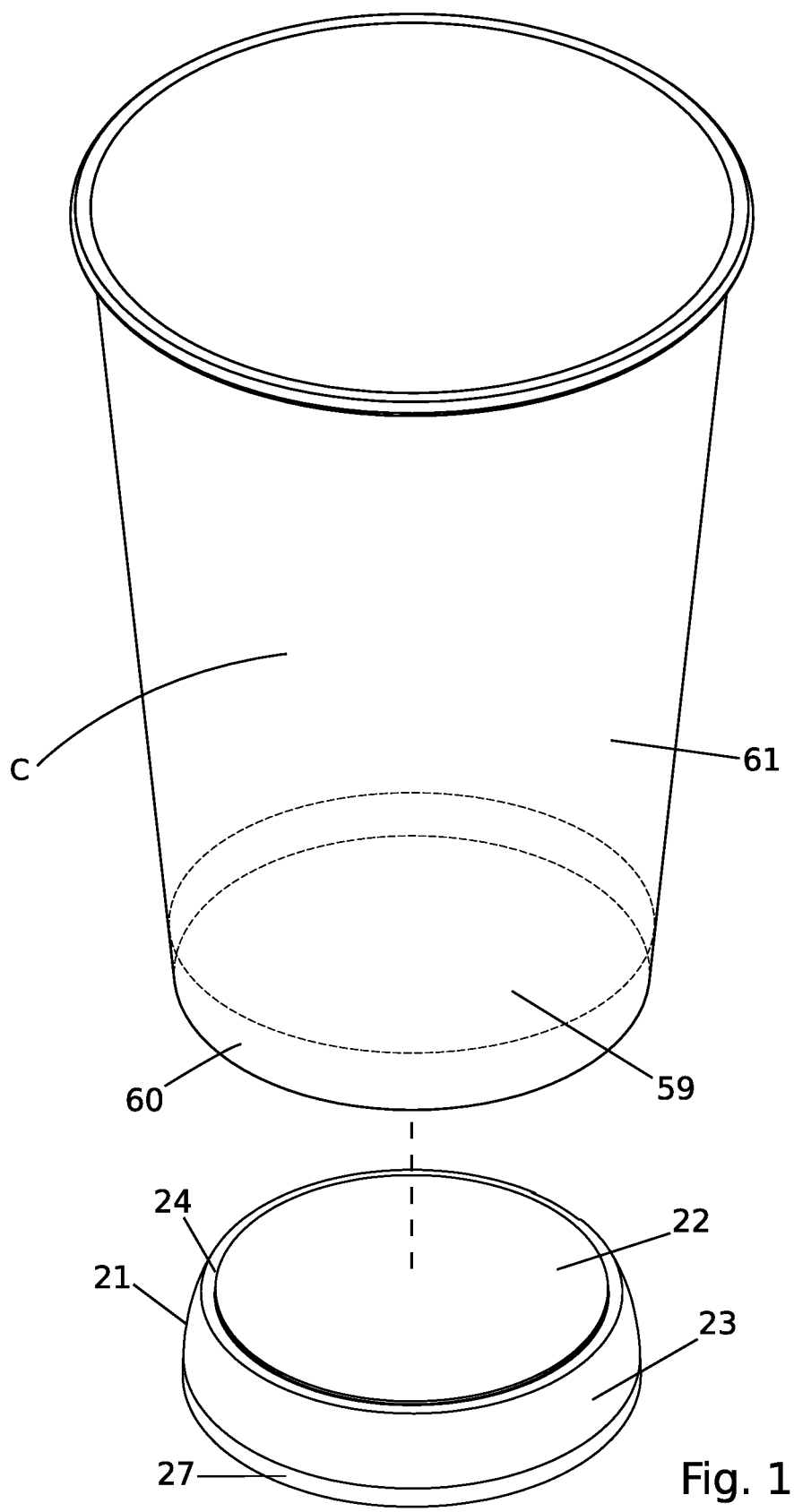
FIG. 1 shows a general perspective view of one form of the apparatus of the invention for warming and maintaining the elevated temperature of consumable liquids.

| Reference Numerals | | | |
|---|---|---|---|
| 21 | electric heating apparatus | 22 | plate |
| 23 | housing | 24 | bevel |
| 25 | PCBA controller | 25a | top surface |
| 25b | bottom surface | 27 | base |
| 29 | thermal film | 31 | heating element |
| 33 | shelf | 35 | boss |
| 37 | window | 39 | female USB connector |
| 41 | switch | 43 | circular hole |
| 43a | circular hole | 43b | circular hole |
| 45a | square hole | 45b | square hole |
| 47 | slot | 49 | electrical components |
| 51 | battery protection unit | 53 | LED indicators |
| 55 | battery charging unit | 57 | USB adapter |
| 59 | bottom wall | 60 | bottom rim |
| 61 | consumable liquid | 71 | wireless charging device |
| 72 | electrical adapter | 73 | planar surface |
| 75 | electrical adapter | 76 | opening |
| 81 | sensors | 82 | trigger |
| 83 | cutouts | 84 | LED indicators |
| 85 | fins | | |

DETAILED DESCRIPTION

FIG. 1 is a perspective view from the top of an electric heating apparatus 21 constructed in accordance with one embodiment. The apparatus here comprises a heating plate 22 mounted on top of a housing 23. When the apparatus is in use, heating plate 22 lies against a bottom wall 59 of disposable hot beverage container "C", which holds a consumable liquid 61. In this embodiment, housing 23 engages circumferentially with a bottom rim 60 of container "C". However, in further embodiments it is also suitable if the circumference of the housing is smaller than that of rim 60. Housing 23 includes a bevel 24, which surrounds the perimeter of plate 22. A base 27 supports both the apparatus and container "C" to rest in a stable upright position on a table, desktop and the like (not shown). In one embodiment, the base and housing consist of polypropylene plastic since it can withstand temperatures above 90° C. while also being firm, flexible and lightweight. Other lightweight and electrically insulating solid materials are also suitable for further embodiments.

Figure 2:
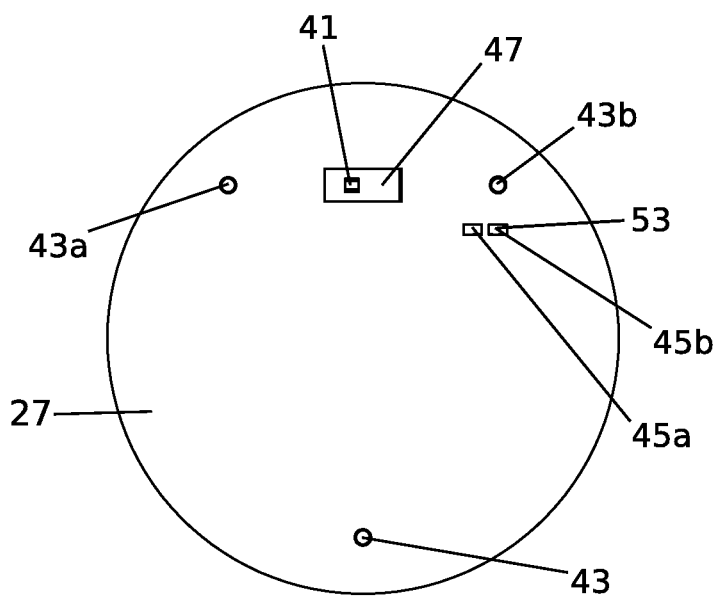
FIG. 2 shows a bottom view of the apparatus shown in FIG. 1.

FIG. 2 is a bottom view of one embodiment of the apparatus, showing base 27 with a circular hole 43 and two other circular holes 43a and 43b to circumferentially surround fasteners, such as screws (not shown here). Square holes 45a and 45b permit a user to view LED indicators 53 from the bottom of the apparatus. In this embodiment, a slot 47 in base 27 allows space for the user to manually slide a switch 41 to either an ON or OFF position.

Figure 3:
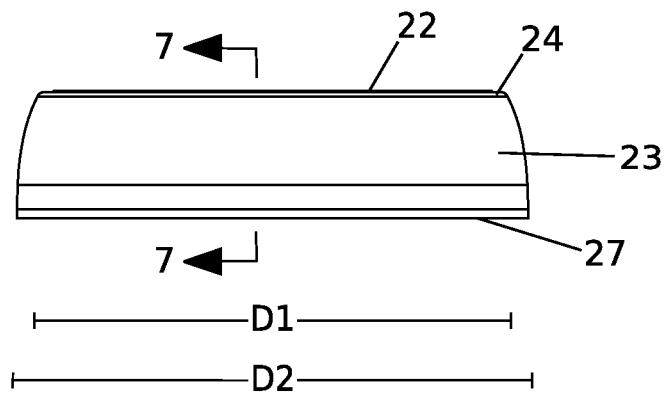
FIG. 3 shows a front view of the apparatus shown in FIG. 1.

FIG. 3 is a front view of the apparatus, showing housing 23 comprising of an upper portion outer diameter DI tapering down to a lower portion outer diameter D2. At present, we contemplate in this embodiment that inner diameter D1 and outer diameter D2 are approximately 52 mm and 56 mm, respectively. Other values for D1 and D2 are also suitable, as long as the circumference of the apparatus is equal to or less than that of bottom rim 60. In many forms of hot beverage containers, the radial tension exerted by the bottom rim on the housing combined with static frictional forces between the bottom rim and the outer surface of the housing are greater than downward gravitational forces exerted on the apparatus. Thus, this embodiment of the apparatus does not require an upward axial force to remain releasably engaged with the bottom rim of many disposable beverage containers. When forms of containers exist such that bottom rim 60 is larger than inner diameter D1 and outer diameter D2 of housing 23, the apparatus and rim no longer contact each other radially. Thus, an external upward axial force may be applied to the apparatus such that the heating plate lies against and underneath bottom wall 59 of the container. For example, plate 22 may engage bottom wall 59 by placing base 27 on a horizontal surface such as a table, desk, or the user's palm (not shown here). Another way of maintaining contact between the surfaces is to manually and continuously press together apparatus 21 and container "C".

Figure 4:
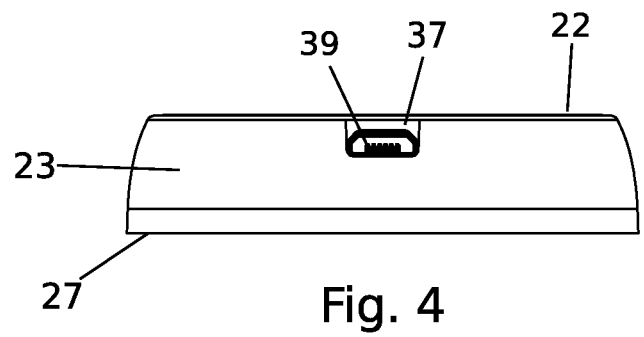
FIG. 4 shows a rear view of the apparatus shown in FIG. 1.

FIG. 4 is a rear view of one embodiment of the apparatus, showing a window 37 aligning with a female USB connector 39, whereby it may receive and connect to a USB adapter (not shown here). Note that housing 23 contains window 37, and heating plate 22 rests above the housing. Heating plate 22 is the uppermost surface of the apparatus. Plate 22 is sandwiched between housing 23 and bottom wall 59 of the beverage container. We presently contemplate that plate 22 of this embodiment be made of copper or aluminum and have a circular planar or convex surface with diameter of approximately 48 mm. However, plate 22 may have surfaces of different sizes and shapes, such as convex, oval, triangular, rectangular, etc., and of different materials, including another type of metal that readily conducts heat from heating element 31 to bottom wall 59.

FIG. 5 is a general perspective, exploded view of the apparatus showing plate 22 adhering to a thermal film 29. Thermal film 29 is concentric to and electrically insulates plate 22 from heating element 31 and a PCBA controller 25. The film also suitably conducts heat from heating element 31 to plate 22. We presently contemplate heating element 31 be embedded into a top surface 25a of PCBA controller 25 such that the top surface containing the element is planar. Other methods of communicating heating element 31 with controller 25 and plate 22 are also suitable. When switch 41 is in the ON position, electric current flows through heating element 31, thereby energizing the element and generating heat. Heat generated by element 31 transfers through film 29 through plate 22 through bottom wall 59 to consumable liquid 61 held in container "C" (FIG. 1). In this embodiment, we contemplate that an adhesive (not shown here) is suitable for attaching plate 22 to film 29 and film 29 to heating element 31 of PCBA controller 25. The adhesive is electrically insulating as well as functional when exposed to high temperatures greater than 100° C. We further contemplate that in this embodiment, fasteners, (not shown here) are suitable for attaching PCBA controller 25 to a shelf 33 of housing 23. However, alternative methods of attaching the heating plate, thermal film, PCBA controller, and housing together are also suitable.

FIG. 6 is a general perspective, bottom, exploded view of the apparatus showing base 27 containing circular holes 43, 43a, 43b, square holes 45a and 45b, and slot 47. Extending from housing 23, shelf 33 provides upward support to a bottom surface 25b of controller 25. When element 31 generates heat, the controller may warm as well. Shelf 33 has a suitable thickness and shape to protect battery "B" from overheating. Also extending from housing 23 is one boss 35 of three, whereby fasteners (not shown here) attach base 27 to housing 23. Each boss 35 is concentric to each circular hole 43. Thus base 27 and shelf 33 sandwich and fix battery "B" inside the apparatus. Mounted on bottom surface 25b of PCBA 25 are electrical components 49. Electrical components 49 in this embodiment comprise of switch 41, female USB connector 39, and other components (not shown here) including a battery protection unit 51, a battery charging unit 55, and LEDs or LED indicators 53 (FIG. 8).

Figure 7:
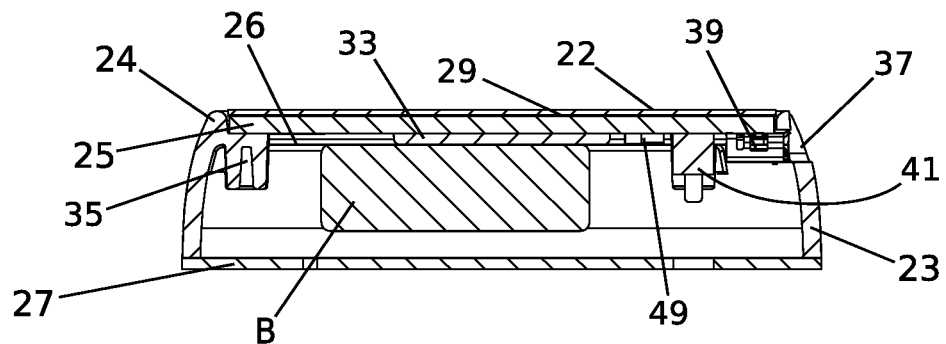
FIG. 7 shows a cross-sectional view taken along lines 7-7 of FIG. 3.

FIG. 7 is a cross-sectional view taken along lines 7-7 of FIG. 3, a front view of electric heating apparatus 21. Note shelf 33 is sandwiched between PCBA controller 25 and battery "B". Also note how boss 35 is configured to receive a fastener (not shown here).

Figure 8:
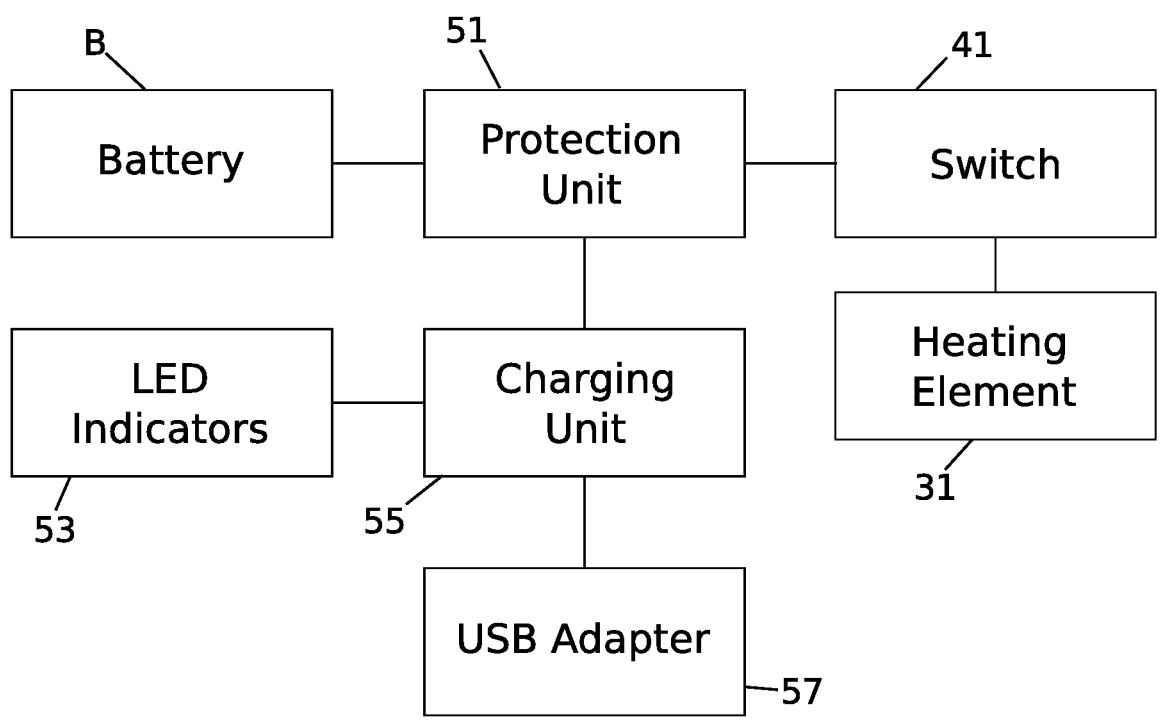
FIG. 8 shows a block diagram of the electrical circuitry in accordance with of one embodiment.

FIG. 8 is a block diagram of the electric circuitry of controller 25 constructed in accordance with one embodiment in which battery "B" is rechargeable. Protection unit 51 detects when battery "B" is discharged, such that the battery voltage is at or below an unsafe level. If the protection unit detects that the battery is charged, such that the voltage is at a safe level, electric current is allowed to flow through heating element 31 when switch 41 is ON. If the battery is discharged according to the protection unit, then no charge is allowed to flow through heating element 31 when switch 41 is ON. When current flows through heating element 31, the element generates heat, which transfers through bottom wall 59 of hot beverage container "C" and into consumable liquid 61 (FIG. 1). When battery "B" is not fully charged, such that its voltage is not at the maximum, the user can charge the battery by connecting USB adapter 57 to female USB connector 39 (FIG. 4). USB adapter 57 supplies electric power from a power source, such as an electric outlet or a power bank (not shown here). When battery "B" is charging via the USB connection and charging unit 55, one of two LED indicators 53 glows red. When charging unit 55 detects battery "B" has charged above a certain voltage, the second of LED indicators 53 glows blue. LED indicators 53 illuminate only when USB adapter 57 supplies electric power to the USB female connector.

Operation

In operation, one uses the apparatus in a normal manner with hot beverage container "C" placed on top of heating plate 22 (FIG. 1). Moreover, housing 23 circumferentially mounts within bottom rim 60 of many forms of disposable paper beverage containers (FIG. 1). Such static frictional forces combined with radial tension between the housing and the bottom rim are often greater than gravitational ones. Unlike prior art, after insertion the apparatus may maintain releasable contact with the beverage container without the aid of external forces. When the apparatus is positioned as described above and the battery is charged, the user can, when desired, send electric current to heating element 31 by sliding switch 41 to the ON position (FIGS. 2, 5, and 8). When the heating element receives electric current, four effects heat or maintain the beverage's elevated temperature:

(1) Electric current passes through heating element 31, thereby generating heat that conducts and/or radiates through thermal film 29 to warm heating plate 22 (FIG. 5).

(2) The top surface of heating plate 22 presses against bottom wall 59 of hot beverage container "C" (FIG. 1).

(3) The overall surface area of hot beverage container "C" exposed to colder air is reduced since plate 22 covers the bottom wall.

(4) Heat from the warmed plate conducts and/or radiates through the bottom wall into consumable liquid 61 (FIG. 1).

When the user desires the beverage to cool naturally, it is only necessary to slide switch 41 to the OFF position and thus no more electric current flows to heating element 31

(FIGS. 2, 5, and 8). Without any electric current, the heating element does not produce heat, and thus the outside air naturally cools the apparatus, container, and beverage.

When battery "B" is discharged below an unsafe voltage, protection unit 51 prevents further discharge from the battery and no more electric current flows to heating element 31 (FIG. 8). Thus, the apparatus, container, and beverage cool naturally.

If battery "B" is not fully charged, the user can, when desired, recharge the battery by inserting USB adapter 57 through window 37 and into female USB connector 39 (FIGS. 6 and 8). Assuming that the USB connection is supplying electric power from a power source, such as an electrical wall outlet or power bank, the battery will charge to a usable and safe voltage, as detected by charging unit 55 and seen by LED indicators 53 through the base (FIGS. 6 and 8). Other adapters for supplying electric power to the battery are also suitable.

Thus the reader will see that at least one embodiment of the electric heating apparatus provides a more reliable, convenient, safe, yet economical device that can be used by persons of almost any age. While the above description contains many specificities, these should not be construed as limitations on the scope, but rather as an exemplification of one embodiment thereof. Many other variations are possible.

Alternative Embodiments

Figure 9:
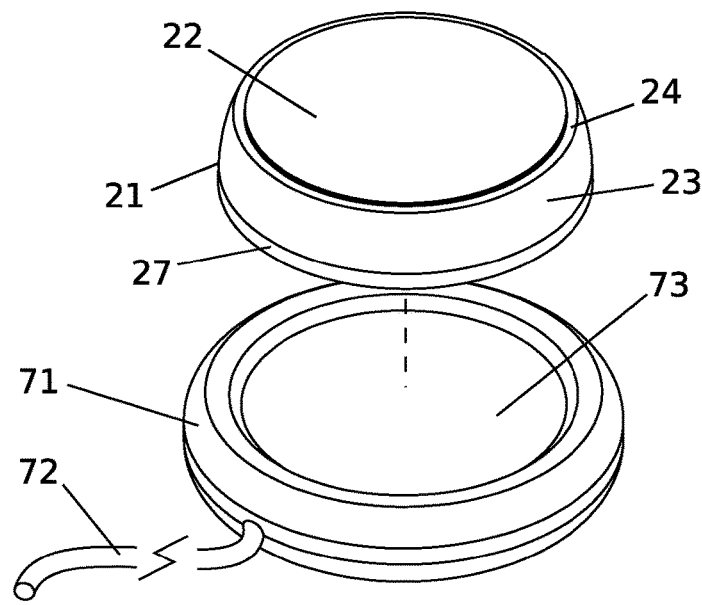
FIG. 9 shows a wireless charging unit in accordance with another embodiment.

FIGS. 9-15 show alternative embodiments of the electric heating apparatus described above. FIG. 9 illustrates one of many various possibilities with regard to charging the battery of the apparatus. In this embodiment, inductive charging is achieved through a wireless charging device 71, which may receive power from an electrical adapter 72. The other end of adapter 72 is connected to a wall outlet, car charger, solar power, or another form of energy. With inductive charging, the battery charges when the apparatus rests on a planar surface 73 of device 71. This embodiment operates as described above but does not contain window 37, USB connector 39, or USB adapter 57 (FIGS. 4 and 8).

Figure 10A:
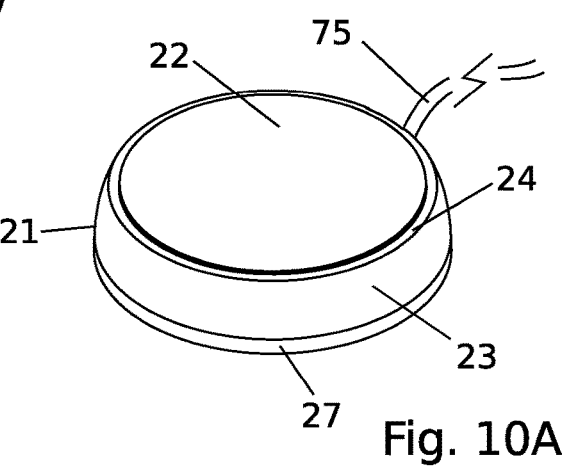
FIG. 10A shows the apparatus connected to an external power source in accordance with another embodiment.
Figure 10B:
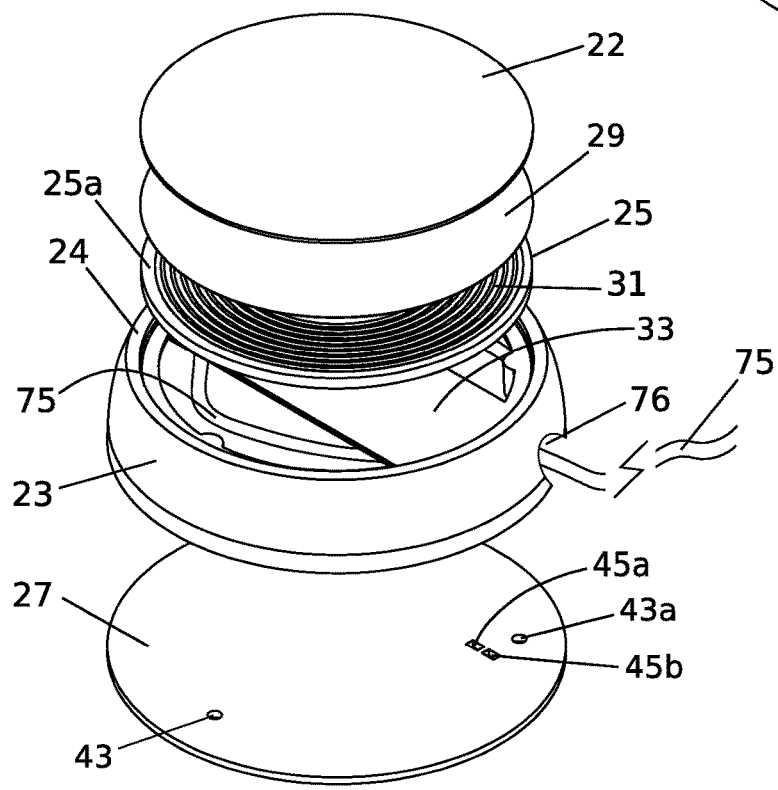
FIG. 10B shows an exploded view of the apparatus shown in FIG. 10A.

There are various possibilities with regard to the power source delivered to the controller and thus the heating element when the apparatus is in use. FIGS. 10A and 10B illustrate electric heating apparatus 21 receiving power from an electrical adapter 75. Electrical adapter 75 may deliver power from various voltage sources, including a 110/120 VAC wall outlet, car adapter, or rechargeable battery pack. FIG. 10B shows adapter 75 passing through housing 23 via an opening 76. Opening 76 also permits base 27 to rest evenly on a table or desktop. Adapter 75 connects to controller 25, which supplies the received electric power to the heating element. A thermoelectric chip (not shown here) may be configured to regulate current flowing to heating 31 element in accordance with the desired elevated temperature of the beverage in the container. In the aforementioned embodiments, heating element 31 may vary in length and gauge to adjust accordingly to the various voltage sources.

Figure 11:
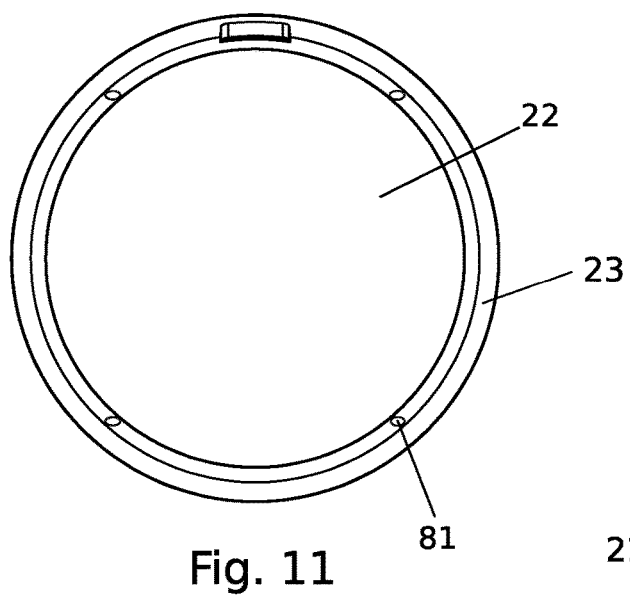
FIG. 11 shows sensors on the apparatus in accordance with another embodiment.

In further embodiments, the apparatus may have thermal sensors 81 on the top surface of housing 23 as shown in FIG. 11. In one embodiment, the sensors may permit the apparatus to heat the liquid to a single temperature, and this heating temperature is not adjustable. In another embodiment, a user may modify the heating temperature by communicating with the PCBA controller. When the apparatus is fixed to the container, sensors 81 record the temperature underneath the container. Sensors 81 are in communication with PCBA controller 25 (FIG. 5). Thus, the controller facilitates the recorded temperature by the sensors as an input. A variable resistor (not shown here) may adjust the output of electric current flow to the heating element. An increase in output current flow increases the amount of heat transferred from the heating element to the heating plate of the apparatus. A decrease in output current flow decreases the amount of heat transferred to the heating plate. If the plate is adjacent to the bottom wall of the container, changes in temperature of the heating plate correlate to changes of the temperature of the liquid held inside the container. Therefore, in these embodiments, the apparatus incorporates a feedback control system for heating the liquid to a preset optimum drinking temperature or to one that is chosen by the user.

Figure 12:
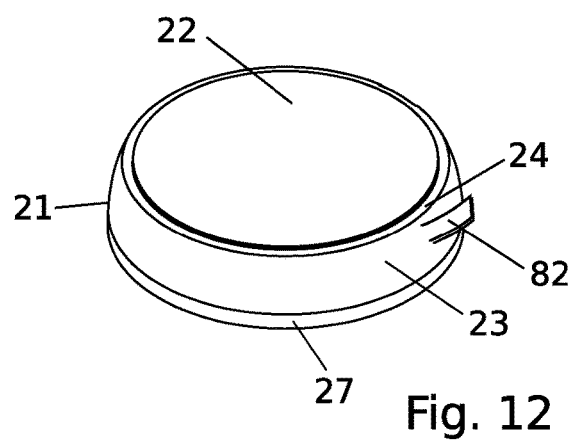
FIG. 12 shows a trigger on the outer housing in accordance with another embodiment.

In further embodiments, switch 41 (FIG. 2) may be placed in a different location or activated by the user through an alternative manual action. Such alternative actions to energize the heating element include pushing a button, touching a surface via a capacitance switch, or pressing a small lever or toggle switch. For example, a pressure-sensitive trigger may be active in a location on the base of the apparatus, on the plate, or on the outer surface of the housing. FIG. 12 shows a trigger 82 extending slightly radially along the perimeter of the outer housing in accordance with one embodiment. In response to radial pressure from the rim of the container, the trigger may be configured to allow current to flow to the heating element. In another embodiment, the weight of the beverage container may activate a trigger on the top surface of the housing (not shown here). In still other embodiments, the user may activate the switch remotely or without physical contact such as by voice activation or by sending a signal via Bluetooth or Wi-Fi from an electronic device such as a phone.

Figure 13:
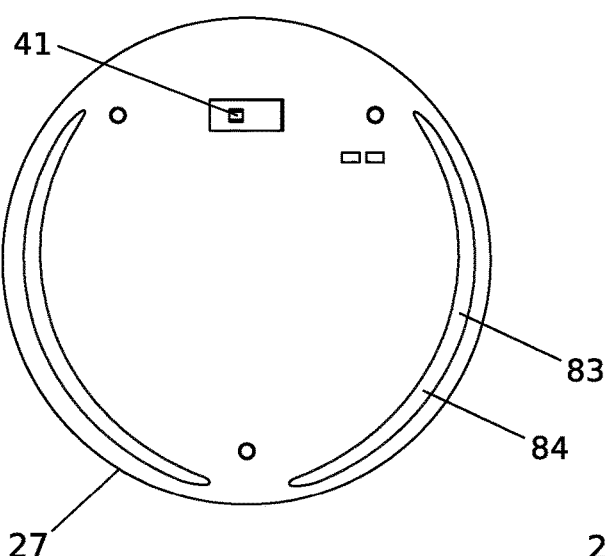
FIG. 13 shows cutouts on the base for visual indications in accordance with another embodiment.

In further embodiments, the electric heating apparatus may visually indicate when the heating element is hot and/or if switch 41 is ON. For example, FIG. 13 shows cutouts 83 on base 27 through which LED indicators 84 may illuminate in accordance with another embodiment. When switch 41 is ON, current flows to the heating element, which warms the heating plate. LED indicators 84 notify the user when the temperature of the surface of the plate is hot to touch. Other locations for the cutouts and LEDs as well as other types of indicators are also suitable in further embodiments. For example, the apparatus may vibrate, glow, or sound when the plate is hot.

Figure 14:
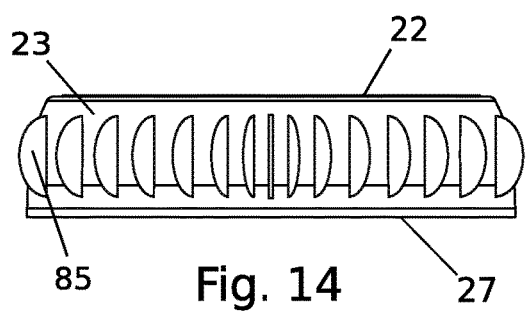
FIG. 14 shows fins extending from the housing in accordance with another embodiment.

FIG. 14 shows fins 85 extending from housing 23 in accordance with another embodiment. Fins 85 may be configured to project out from housing 23 in a substantially perpendicular fashion. The material used for fins 85 may be flexible and/or durable to facilitate allowing the fins to deform and/or bend when the electric heating apparatus is placed and/or twisted into the bottom rim of the container. Although fins have been described to facilitate retaining and securing the apparatus in the bottom rim of the container, it should be understood that various other structures and/or materials may accomplish a similar objective. For example, a gripping surface that contains ridges and the like or other shapes of extrusions from the housing may facilitate securing the apparatus within the perimeter of the bottom rim of the container. Furthermore, different materials that may be deformable, such as flexible rubber, are also suitable in accordance with other embodiments.

Figure 15:
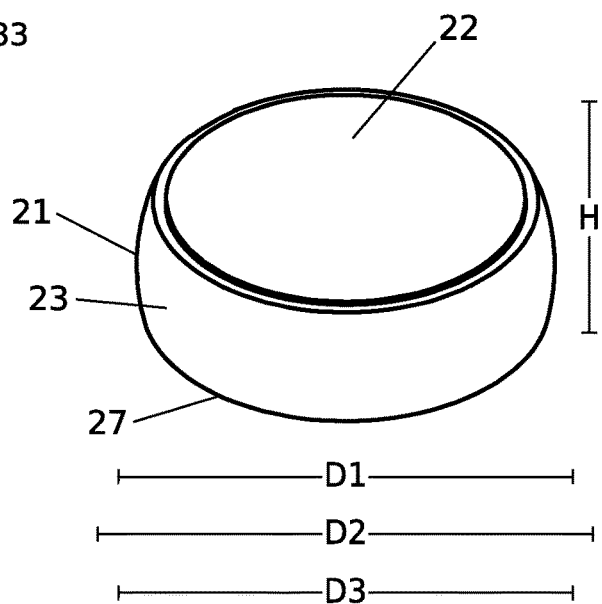
FIG. 15 shows a curved shape of housing in accordance with another embodiment.

In further embodiments, housing 23 may have different shapes and sizes of the outer surface of the lower portion of housing extending below bottom rim 60 (FIG. 1). For example, FIG. 15 shows a curved shape of housing in accordance with other embodiments. Although diameter D1 still tapers down to larger diameter D2, diameter D3 decreases in the lower portion of housing 23. In another embodiment, the diameter in the lower part of the housing may be greater than or equal to D2. Furthermore, various values for height H are suitable as well as various colors of the apparatus.

CONCLUSION

Thus the reader will see that the electric heating apparatus of the various embodiments can be used to maintain the elevated temperature of a liquid held in a paper beverage container. At least one embodiment of the apparatus provides a more portable, versatile, and convenient device that can be used for almost any paper beverage container at a coffee shop, home, or office. In addition, after each use, the apparatus may be removed from below the beverage container and stored without the necessity of cleaning.

It will be understood that the provision of examples and many specificities in the description above should not be interpreted as limiting the scope of the embodiments, but as merely illustrating some of several possible embodiments. For example, the described adhesive attaching the plate, PCBA controller, and housing may be replaced by fasteners or some other method that joins all three together; the electric heating apparatus may be used with other types and materials of beverage containers, such as steel cups and ceramic mugs.

Other variations and modifications in the individual parts or the relative assembly will be apparent to those of ordinary skill in the art. It is the intent that the spirit and scope of the embodiments should be determined by the following claims.

We claim:

1. An electric heating apparatus for warming and maintaining the elevated temperature of a liquid within a beverage container, comprising:
    a housing having an outer cylindrical surface with an upper portion having a perimeter concentric thereto and smaller than a perimeter of a lower portion with a convex downward curving profile configured to mount underneath said beverage container and accommodate a dimensional range of said beverage container;
    a rechargeable battery disposed inside said housing having means for supplying electric power to a heating element;
    a controller enclosed in said housing, having said heating element embedded onto its top surface, further including electrical circuitry electronically coupled between said heating element and said rechargeable battery;
    said housing further including a horizontal shelf having means for providing an axial distance and pockets of air between said controller and said rechargeable battery, whereby said controller will be supported by said horizontal shelf and said heating element will be thermally insulated from said rechargeable battery;
    a heating plate positioned to extend above said housing, being sandwiched between said controller and said beverage container, and being contiguous and thermally connected to said heating element having a metallic surface further including an electrically insulating bottom portion, whereby heat will move upward from said heating element through said heating plate to said beverage container; and
    a switch positioned in said housing and being operably associated with said controller and electronically coupled between said rechargeable battery and said heating element.

2. The apparatus of claim 1 wherein said beverage container is comprised of a layer of a paper-based material, having a bottom wall defining a closed end of said beverage container and a side wall defining a bottom rim of said beverage container wherein said bottom rim continuously extends below said bottom wall, having formed a cylindrical recess having a diameter of approximately between 54 and 56 mm at the bottommost edge of said bottom rim.

3. The apparatus of claim 2 wherein said outer surface of said upper portion of said housing has a diameter of approximately 52 mm and wherein said outer surface of said lower portion of said housing has a diameter of approximately 57 mm at its largest perimeter, such that said housing has means for circumferentially engaging and removably fastening with said bottom rim of said beverage container, whereby said heating plate will be contiguous with said bottom wall of said beverage container.

4. The apparatus of claim 1 further including a disconnectable electrical connection having means for providing electric power to said rechargeable battery.

5. The apparatus of claim 1 further including a wireless charging device having means for providing electric power to said rechargeable battery.

6. The apparatus of claim 1 wherein said electrical circuitry of said controller further comprises:
    a battery charging unit operably associated with said rechargeable battery configured to supply electric power from a power source to said rechargeable battery;
    LED indicators illuminating when said rechargeable battery is fully charged; and
    a battery protection unit operably associated with said rechargeable battery configured to suspend supply of electric power to said heating element from said rechargeable battery when said rechargeable battery has reached or fallen below a predetermined unsafe voltage.

7. The apparatus of claim 1 wherein said switch has at least an ON position.

8. The apparatus of claim 1 wherein said housing maintains its structural and functional integrity subject to temperatures up to approximately 90° C.

9. The apparatus of claim 1 wherein said liquid inside said beverage container has a consumption temperature between approximately 50° C. and 65° C., whereby said apparatus will maintain said consumption temperature.

10. The apparatus of claim 1 wherein said metallic surface of said heating plate is planar and comprised of aluminum.

11. The apparatus of claim 1 wherein said controller is comprised of a printed circuit board wherein said electrical circuitry is positioned on its bottom surface.

12. The apparatus of claim 1 wherein said heating plate further includes a thermal film contiguous with its bottom portion comprised of thermally conducting and electrically insulating material.

13. The apparatus of claim 1 further including a base positioned horizontally, being attached to said housing, having means for fixing said rechargeable battery in said housing and for supporting both said apparatus and said beverage container to rest in a stable upright position.

14. The apparatus of claim 1 wherein said electrical circuitry of said controller is further comprised of a means for adjusting the amount of electric current delivered to said heating element from said rechargeable battery, whereby a range of selected temperatures of said liquid will be maintained.

15. The apparatus of claim 1 further including at least one sensor positioned in said housing in electronic communication with said controller having means for delivering electric power from said rechargeable battery to said heating element when said beverage container is contiguous with said heating plate and having farther means for suspending supply of electric power from said rechargeable batter to said heating element when said beverage container is not contiguous with said heating plate.

16. A method of warming or maintaining the elevated temperature of a liquid inside a beverage container, comprising:
  (a) providing an electric heating apparatus comprising a housing having an outer cylindrical surface with an upper portion perimeter of approximately a 52 mm diameter concentric to a lower portion perimeter of approximately 57 mm diameter with a convex downward curving shape, a heating plate contiguous with a heating element, which is energized by a rechargeable battery, a controller enclosed in said housing, having said heating element embedded onto its top surface, further including an electrical circuitry electronically coupled between said heating element and said rechargeable battery; and a power switch positioned in said housing being operably associated with said controller and electronically coupled between said heating element and said rechargeable battery;
  (b) providing a beverage container having a bottom wall defining a closed end of said beverage container and a side wall defining a bottom rim having diameter of approximately between 54 and 56 mm being extended below said bottom wall;
  (c) inserting said electric heating apparatus within the perimeter of said bottom rim such that said heating plate is contiguous with said bottom wall of said beverage container; and
  (d) switching said power switch to an ON position such that said rechargeable battery energizes said heating element, whereby said heating plate will warm said bottom wall of said beverage container, whereby said electric heating apparatus will removably fasten underneath a multitude of beverage containers having a range of bottom rim sizes.

17. The method of claim 16 wherein said liquid inside said beverage container has a consumption temperature between approximately 50° C. and 65° C. whereby said apparatus will maintain said consumption temperature.

18. An electric heating apparatus for warming and maintaining the elevated temperature of a liquid within a beverage container, comprising:
  a housing having an outer cylindrical surface with an upper portion having a perimeter concentric thereto and smaller than a perimeter of a lower portion with a convex downward curving profile configured to mount underneath said beverage container and accommodate a dimensional range of said beverage container;
  an electric power adapter having opposing end connectors wherein a front connector is in electrical communication with a heating element and a back connector is in electrical communication with a power supply;
  a controller enclosed in said housing, having said heating element embedded onto its top surface, further including an electrical circuitry electronically coupled between said heating element and said electric power adapter;
  a heating plate positioned to extend above said housing, sandwiched between said controller and said beverage container, and being contiguous and thermally connected to said heating element, further including a metallic surface containing an electrically insulated bottom portion, whereby heat will move upward from said heating element through said heating plate to said beverage container, and
  a switch positioned in said housing and being operably associated with said controller and electronically coupled between said electric power adapter and said heating element.

19. The apparatus of claim 18 wherein said back connector comprises of a plug configured to electrically communicate with said power supply such that said power supply is a wall outlet of approximately 110/120 VAC.

* * * * *